(12) United States Patent
Weber et al.

(10) Patent No.: US 8,636,051 B2
(45) Date of Patent: Jan. 28, 2014

(54) FREE AIR STREAM HEAT EXCHANGER DESIGN

(75) Inventors: Richard M. Weber, Prosper, TX (US); Gary Schwartz, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/046,630

(22) Filed: Mar. 11, 2011

(65) Prior Publication Data
US 2012/0227950 A1    Sep. 13, 2012

(51) Int. Cl.
*B64D 33/12* (2006.01)

(52) U.S. Cl.
USPC .................. 165/44; 165/41; 165/77; 165/86; 165/96; 244/57

(58) Field of Classification Search
USPC ................ 165/41, 44, 86, 96, 77; 244/57
See application file for complete search history.

(56) References Cited

U.S. PATENT DOCUMENTS

| | | | |
|---|---|---|---|
| 1,346,577 A | | 7/1920 | Whitbeck |
| 1,398,330 A | * | 11/1921 | Kirkham .......................... 244/57 |
| 1,412,073 A | * | 4/1922 | Wagenseil ....................... 244/57 |
| 1,486,644 A | * | 3/1924 | Durr ................................ 244/57 |
| 1,547,383 A | * | 7/1925 | Grant .............................. 244/57 |
| 1,779,718 A | * | 10/1930 | Thurston ......................... 244/57 |
| 1,807,514 A | | 5/1931 | Dewoitine |
| 2,216,111 A | | 10/1940 | Huet |
| 2,249,948 A | | 7/1941 | Dornier |
| 2,291,607 A | | 8/1942 | Chausson |
| 3,292,864 A | * | 12/1966 | Edkins .......................... 244/12.5 |
| 3,804,353 A | * | 4/1974 | Scott et al. ...................... 244/57 |
| 4,203,566 A | | 5/1980 | Lord |
| 4,660,624 A | * | 4/1987 | Yamaguchi ..................... 165/41 |
| 4,852,815 A | * | 8/1989 | Giannotti ........................ 241/65 |
| 6,658,881 B1 | * | 12/2003 | Plattner .......................... 62/239 |
| 7,665,694 B2 | * | 2/2010 | Hein et al. .................. 244/129.5 |

FOREIGN PATENT DOCUMENTS

| | | |
|---|---|---|
| DE | 678 843 C | 7/1939 |
| GB | 516099 | 12/1939 |
| GB | 2131941 A | 6/1984 |

OTHER PUBLICATIONS

Extended European Search Report for European Application No. 12158402.3, Filed Mar. 7, 2012, Extended European Search Report dated Oct. 12, 2012 and mailed Oct. 22, 2012 (8 pgs.).
Sighard F. Hoerner, "Fluid-Dynamic Drag", Published by the Author 1996, Library on Congress Catalog Card No. 64-19666 (4 pgs.).
Office Action mailed Jul. 9, 2012 for U.S. Appl. No. 13/046,597, filed Mar. 11, 2011, Inventor Richard M. Weber et al. (8 pgs.).
Final Office Action mailed Dec. 7, 2012 for U.S. Appl. No. 13/046,597, filed Mar. 11, 2011, Inventor Richard M. Weber et al. (8 pgs.).

* cited by examiner

*Primary Examiner* — John Ford
(74) *Attorney, Agent, or Firm* — Christie, Parker & Hale, LLP (57) ABSTRACT

The present invention relates to heat exchangers, and more particularly to a heat exchange apparatus configured to operate in a free air stream. In an embodiment, a heat exchange apparatus configured to operate in a free air stream includes a heat exchange structure having a shape configured to conform to a body of a vehicle when in a stowed condition; and a deployment mechanism for moving the heat exchange structure to a deployed condition external to the vehicle. The heat exchange structure has a curved surface that is concave into the air stream when the heat exchange structure is in the deployed condition.

6 Claims, 10 Drawing Sheets

FREE AIR STREAM HEAT EXCHANGER DESIGN

FIELD OF THE INVENTION

The present invention relates to heat exchangers, and more particularly to a heat exchange apparatus configured to operate in a free air stream.

BACKGROUND

Heat exchangers are devices used to transfer heat from one medium to another. Heat exchangers come in many forms, and can have different structures depending on the heat load to be transferred and the environment in which the heat exchanger is used. Vehicles such as automobiles and aircraft utilize heat exchangers to transfer heat generated by the vehicle to a heat transfer medium, such as air or coolant fluid flowing around or through the heat exchanger. For example, air may flow over a coil carrying hot engine coolant, and heat from the coil may be released into the air. In addition, large amounts of heat can be generated by an aircraft engine or other aircraft components, especially in large aircraft, and it may be necessary to quickly and efficiently transfer the heat away from the aircraft. For instance, a Next Generation Jammer (NGJ) pod attached to the side of a fighter aircraft may need to release a heat load of 40 to 60 kW at any given time.

Heat exchangers in aircraft are generally internally mounted in a duct or a plenum of the aircraft, and the duct or plenum may draw air into the aircraft through inlet ducts. However, the design and configuration of internally mounted heat exchangers may be constrained by the size of the aircraft in which they are carried. That is, some aircraft may not have sufficient packaging volume on board to accommodate an internally mounted heat exchanger. In other cases, the heat exchanger may need to be very small in size due to packaging size limitations imposed by the size of the aircraft. Consequently, many heat exchanger designs and configurations have been driven by a desire to maximize heat exchange capacity while minimizing the size of the heat exchanger. Additionally, internally mounted heat exchangers may have insufficient surface area to completely release, or dump, the heat load generated by an aircraft or aircraft component.

In order to address this problem, strip heat exchangers have been designed for use on the side of aircraft pods (e.g., an ALQ 99 or ALQ 184 jammer pod). Strip heat exchangers can be used in situations where there are significantly lower heat loads and higher allowable coolant temperatures. However, such designs may have inadequate heat exchanging capacity in situations where there are higher heat loads and lower required coolant temperatures, because there may be insufficient surface area on the strip heat exchanger for dumping the required heat load.

Accordingly, there is a need for a heat exchanger design and configuration that provides improved heat transfer capability for larger heat loads and is configured to operate in a vehicle having packaging size limitations, such as an aircraft.

SUMMARY

The present invention relates to heat exchangers, and more particularly to a heat exchange apparatus configured to operate in a free air stream. In a free air stream, unlike in a duct or plenum, there is more air surrounding the heat exchange apparatus, and less pressure drop in the air around the front surface of the apparatus, because the air stream is unimpeded. As a result, the heat exchange apparatus has greater heat transfer capability for larger heat loads.

In an embodiment, a heat exchange apparatus configured to operate in a free air stream includes a heat exchange structure having a shape configured to conform to a body of a vehicle when in a stowed condition; and a deployment mechanism for moving the heat exchange structure to a deployed condition external to the vehicle. The heat exchange structure may have a curved surface that is concave into the air stream when the heat exchange structure is in the deployed condition.

The heat exchange structure may be substantially cylindrical in shape. The heat exchange structure may be tapered.

The heat exchange structure may be moved by the deployment mechanism in a direction toward a tail of the vehicle.

The heat exchange structure may be moved by the deployment mechanism in a direction toward a nose of the vehicle.

In a further embodiment the heat exchange structure is configured to retract into the stowed condition and expand into the deployed condition. The heat exchange structure may be configured to expand to increase its frontal area in the deployed condition. The heat exchange structure may include a plurality of panels that move laterally relative to the air stream to increase the width of the heat exchange structure in the deployed condition. In one embodiment the panels have curved surfaces, and at least one panel of the plurality of panels is disposed to be convex into the air stream and other panels of the plurality of panels are disposed to be concave into the air stream when the heat exchange structure is in the deployed condition. The heat exchange structure may further include a plurality of panels that unfold to increase the width of the heat exchange structure in the deployed condition.

The heat exchange apparatus may further include slats coupled to at least one edge of the heat exchange structure to reduce air spillage around the heat exchange structure.

In another embodiment, a method of operating a heat exchange apparatus in a free air stream includes providing a heat exchange surface and a deployment mechanism; stowing the heat exchange structure to conform to a body of a vehicle when in a stowed condition; and deploying the heat exchange structure to a deployed condition external to the vehicle. The heat exchange structure may have a curved surface, and the step of deploying the heat exchange surface may include moving the heat exchange surface to a deployed condition such that the curved surface is concave into the air stream.

The step of deploying the heat exchange structure may include moving the heat exchange structure in a direction toward a tail of the vehicle.

The step of deploying the heat exchange structure may include moving the heat exchange structure in a direction toward a nose of the vehicle.

The method of operating the heat exchange apparatus in a free air stream may further include expanding the heat exchange structure to increase a frontal area of the heat exchange structure in the deployed condition. The expanding the heat exchange structure may include expanding the heat exchange structure to increase its width in the deployed condition. The method may further include retracting the heat exchange structure into the stowed condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention relates to heat exchangers, and more particularly to a heat exchange apparatus configured to operate in a free air stream. In a free air stream, unlike in a duct or plenum, there is more air surrounding the heat exchange apparatus, and less pressure drop in the air around the front surface of the apparatus, because the air stream is unimpeded. As a result, the heat exchange apparatus has greater heat transfer capability for larger heat loads.

In one embodiment, a heat exchange apparatus includes a heat exchange structure configured to conform to the body of a vehicle such as an aircraft, and a deployment mechanism for deploying the heat exchange apparatus to a position external to the vehicle. Once deployed, the heat exchange apparatus can release (or dump) heat overboard into the free air stream. The deployed heat exchange structure may have a curved front surface that is concave facing the air stream, to scoop up air as it moves through the air stream. Accordingly, the mass flow rate of air through the heat exchange apparatus can be increased, further improving its heat transfer capacity.

According to an embodiment of the present invention, a heat exchange apparatus is configured to conform to a mold line of a vehicle such as an aircraft, or a vehicle component such as an aircraft pod. FIGS. 1A through 3B are side views of such configurations.

Figure 1A:
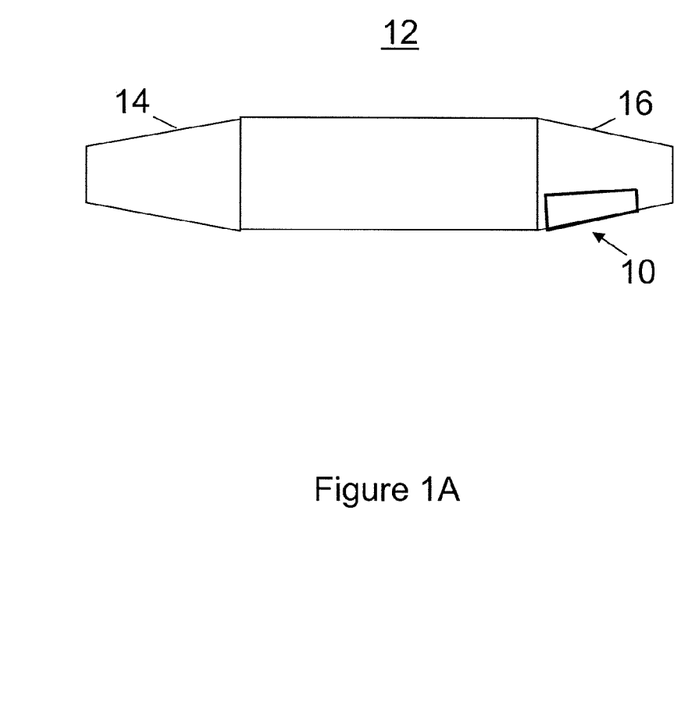
FIGS. 1A and 1B are side views of a heat exchange apparatus according to an embodiment of the present invention.
Figure 1B:
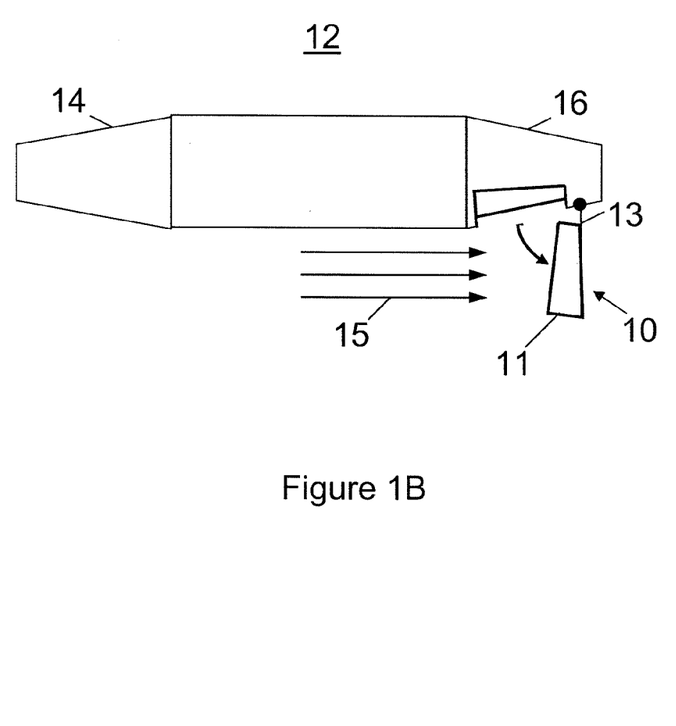

Referring to FIG. 1A, in one embodiment a heat exchange apparatus 10 is configured (or installed) to conform to the shape of a vehicle 12. As shown in FIG. 1A, in one embodiment the heat exchange apparatus 10 is stowed away in the vehicle 12 in a stowed condition such that a rear surface of the heat exchange apparatus 10 conforms to a mold line of the vehicle 12. The heat exchange apparatus 10 may be stowed in the tail 16 of the vehicle 12 as shown in FIG. 1A, or may be stowed in any other suitable part of the vehicle, such as the nose 14 or body of the vehicle 12. According to an embodiment of the present invention, when the heat exchange apparatus 10 is in a stowed condition and stowed away in the vehicle 12, the rear surface of the heat exchange apparatus 10 encloses the stowing compartment and therefore protects the interior of the vehicle 12 and provides a continuous load path across the closeout of the vehicle structure. As shown in FIG. 1B, the heat exchange apparatus 10 includes a heat exchange structure 11, and a deployment mechanism 13 configured to deploy the heat exchange structure 11. The deployment mechanism 13 may include any suitable means for deploying the heat exchange structure 11 into the free air stream 15, such as an electrically or hydraulically operated deployment mechanism. In addition, the deployment mechanism 13 may be configured to retract the heat exchange structure 11 back into the stowed condition. The heat exchange structure 11 may be tapered toward one end of the structure (e.g., the top end) as shown, and may have any suitable shape, such as a cylindrical segment shape.

Figure 2A:
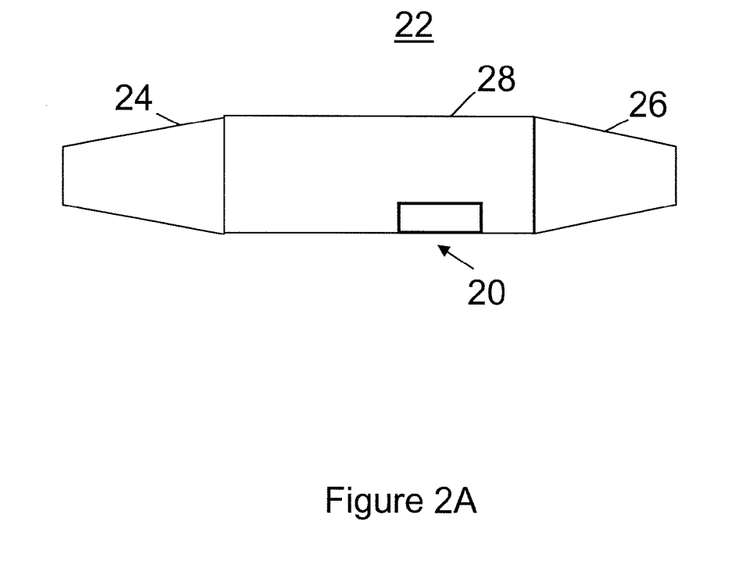
FIGS. 2A and 2B are side views of a heat exchange apparatus according to an embodiment of the present invention.
Figure 2B:
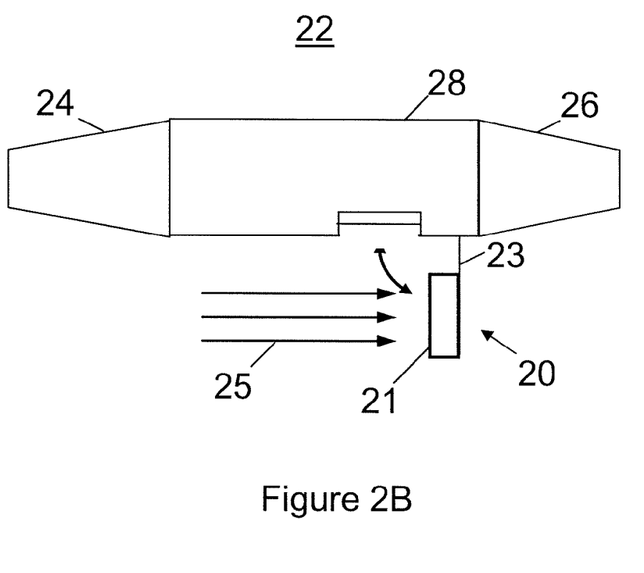

As shown in FIGS. 2A and 2B, a heat exchange apparatus 20 may be stowed in the body 28 of a vehicle 22 in a stowed condition. As shown in FIG. 2A, in one embodiment when the heat exchange apparatus 20 is in a stowed condition and stowed away in the body 28, the rear surface of the heat exchange apparatus 20 encloses the stowing compartment and therefore protects the interior of the vehicle 22 and provides a continuous load path across the closeout of the vehicle structure. The heat exchange apparatus 20 may be deployed from the stowing compartment in a direction toward the tail 26 and away from the nose 24 of the vehicle 22, into a free air stream 25.

Figure 3A:
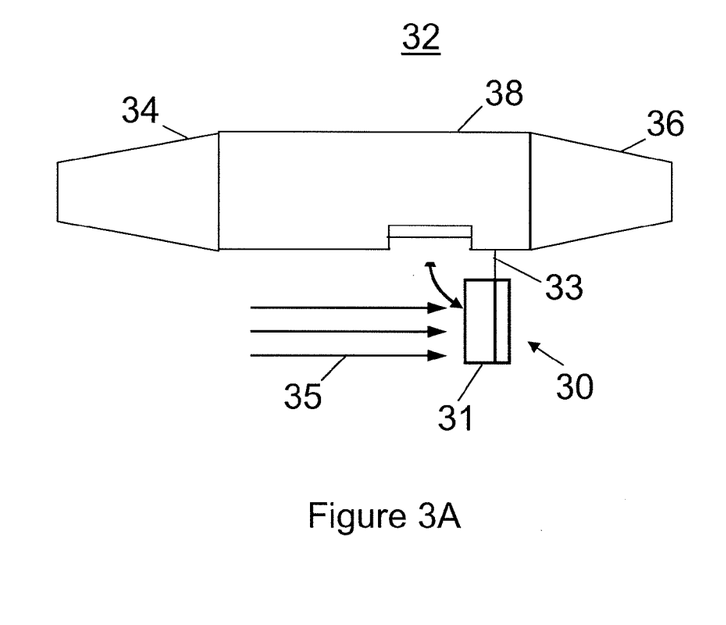
FIGS. 3A and 3B are side views of a heat exchange apparatus according to an embodiment of the present invention.
Figure 3B:
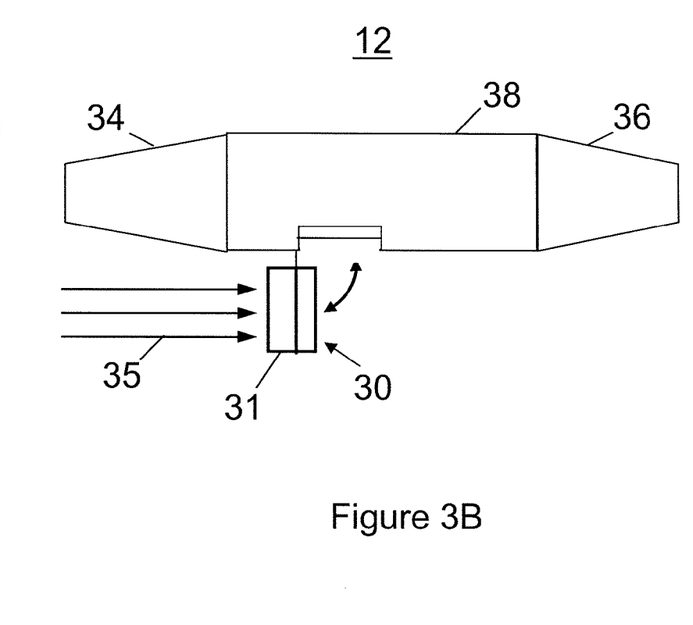

FIGS. 3A and 3B show a deployment configuration according to another embodiment of the present invention. As shown in FIG. 3A, a heat exchange apparatus 30 may be stowed in the body 38 of a vehicle 32. The heat exchange apparatus 30 may be deployed from the stowing compartment in a direction toward the tail 36 and away from the nose 34 of the vehicle 32, into a free air stream 35. The heat exchange apparatus 30 is deployed in a direction with the flow of the free air stream 35, for example, by being pivoted or "flipped" backward away from the nose 34 into the free air stream. As shown in FIG. 3B, the heat exchange apparatus 30 may be deployed from the stowing compartment in a direction toward the nose 34 and away from the tail 36 of the vehicle 32, to face the free air stream 35. The heat exchange apparatus 30 is deployed in a direction against the flow of the free air stream 35, for example, by being pivoted or "flipped" forward toward the nose 34 into the free air stream.

Figure 4:
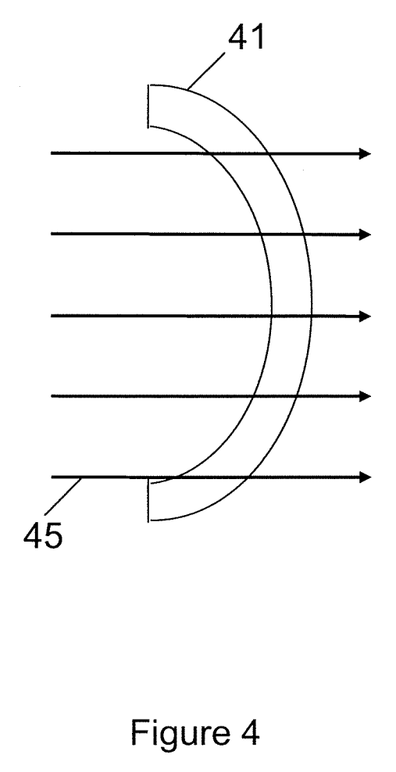
FIG. 4 is a top plan view of a heat exchange structure according to an embodiment of the present invention.

FIG. 4 is a top plan view of a heat exchange structure 41 configured to operate in a free air stream 45. When the heat exchange structure 41 is deployed into the free air stream 45, the heat exchange structure 45 encounters pressure drag from the distribution of forces normal to the front surface of the heat exchange structure. The amount of pressure drag encountered by the front surface of the heat exchange structure 41 depends on the size and shape of the structure. The greater the amount of pressure drag, the greater the air impact pressure at the front surface of the heat exchange structure 41.

In order to improve the heat transfer capacity of the heat exchange apparatus, that is, increase the size of the heat load that the heat exchange apparatus can dump overboard, the heat exchange structure 41 should have a large amount of pressure drag applied at its front end. When the air impact pressure at the front surface of the heat exchange structure 41 is increased, more air is forced through the heat exchange structure 41, and thus more heat can be transferred by the heat exchange apparatus into the free air stream 45 and away from the vehicle. Therefore, it is desirable for the heat exchange structure 41 to have a shape with a relatively high drag coefficient. A higher drag coefficient indicates a greater air impact pressure at the front surface of the structure when the structure moves through a fluid, such as air. Thus, when the structure is porous, more air can be forced through the structure.

The drag coefficient of a structure moving through a fluid varies as a function of the shape of the structure. For example, a two-dimensional (2-D) non-porous flat disk moving through a given fluid has a drag coefficient of about 1.98, a 2-D non-porous bowl-shaped structure that is convex into the fluid stream has a drag coefficient of about 1.20, and a 2-D non-porous bowl-shaped structure that is concave into the fluid stream has a drag coefficient of about 2.30. Accordingly, in one embodiment, a heat exchange apparatus has a structure that is concave into a free air stream in a deployed condition. As shown in FIG. 4, the surface of the heat exchange structure 41 faces the free air stream 45 and scoops the air up into its surface. However, the invention is not limited to heat exchange structures that are concave into an air steam, and heat exchange structures according to other embodiments of the present invention may be formed as flat disks or may be configured to be convex into the free air stream in a deployed condition, instead of concave into the air stream.

Figure 5A:
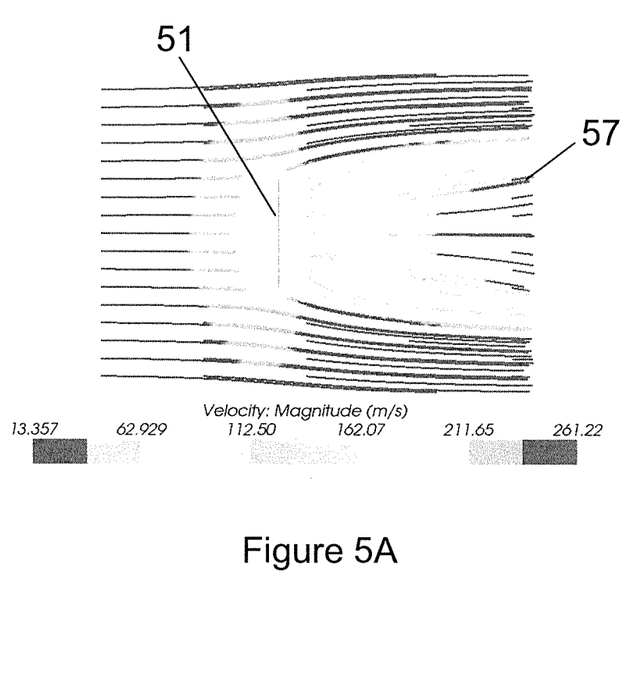
FIG. 5A is an air velocity profile of a heat exchange structure according to an embodiment of the present invention.
Figure 5B:
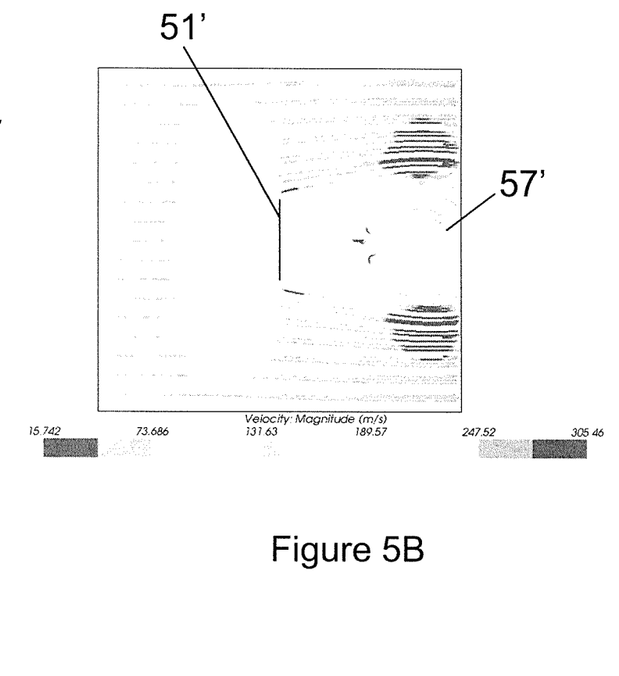
FIG. 5B is an air velocity profile of a heat exchange structure according to another embodiment of the present invention.

FIGS. 5A and 5B are air velocity profiles showing air flow through three-dimensional (3-D) porous structures such as a concave shaped structure 51 and a flat disk 51'. When porous structures move through an air stream, the air takes the path of least resistance through the structure. As shown in FIGS. 5A and 5B, there are more air flow paths 57 passing through a concave shaped structure 51 than air flow paths 57' passing through a flat disk 51', because there is more surface area on the concave shaped structure 51 for air to be forced through than in a flat disk 51'. In addition, the concave shaped structure 51 may exhibit greater pressure lowering on the back end in comparison with the flat disk shape 51'. Therefore, the concave shaped structure 51 may have improved air capture qualities and can force a greater amount of air through a given area of its surface than can the flat disk 51'.

While the profiles shown in FIGS. 5A and 5B represent air flow through porous structures, actual heat exchange structures may have channels through which air can pass, rather than pores. In one embodiment, heat exchange channels are designed as straight lines through the heat exchange structure, to force air from the free air stream through the heat exchange apparatus. However, as shown in FIG. 5A, in the concave shaped structure 51 not all of the air flow paths 57 follow a straight line. Accordingly, in one embodiment the flow paths 57 serve as guidelines for designing channels of a concave shaped heat exchange structure 51 to be aligned with flow paths similar to the flow paths 57 through the heat exchange structure. The designed channels thus facilitate air flow through the heat exchange structure, rather than forcing it through linear channels, so that a greater amount of air can be captured. The channels may also be designed to have aerodynamic shapes as described in U.S. patent application Ser. No. 13/046,597 entitled "Aerodynamic Heat Exchange Structure", filed concurrently with this application, which is incorporated herein by reference.

In addition to the pressure drag encountered at the front surface of a structure moving through a fluid as explained above, drag results from a tangential force caused by fluid moving past the surface of a structure. Thus, while an increase in pressure drag at the front surface of a porous structure can increase the amount of air forced through the structure in a free air stream, a lower drag is desirable to reduce the forces opposing the structure's movement through the air stream.

Figure 6:
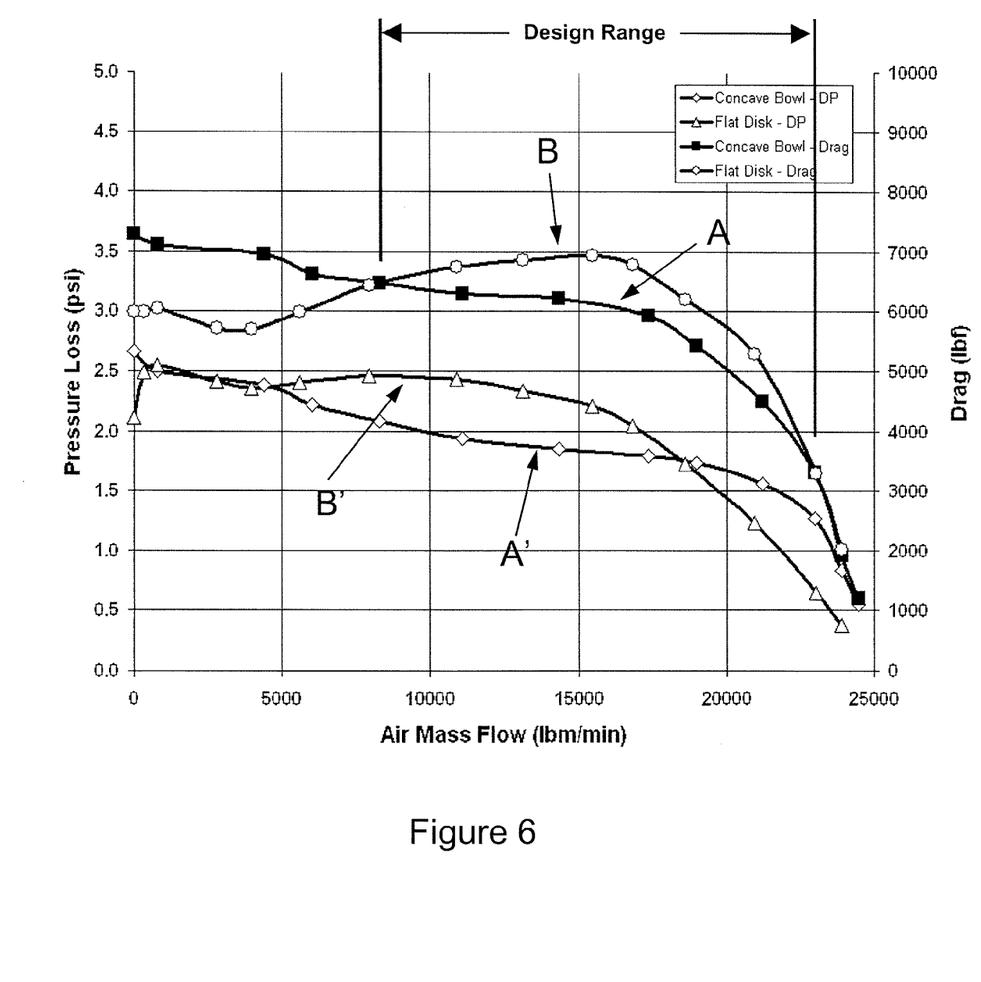
FIG. 6 is a graph comparing pressure loss and drag characteristics of heat exchange structures according to embodiments of the present invention.

The graph in FIG. 6 compares pressure loss and drag characteristics of a concave shaped structure and a flat disk structure over a range of porosities. The structures have the same projected surface area and move through the same air stream, and each structure has a different porosity to achieve the same air mass flow rate through the structure. At an air mass flow rate of zero pound mass per minute (lbm/min), the porosity of each structure is zero and the structures are solid (i.e., non-porous).

The curves A and B in FIG. 6 illustrate variations in drag according to different air mass flow rates. The curve A represents the drag encountered by a porous bowl that is concave into the air stream, and the curve B represents the drag encountered by a porous flat disk. As shown in FIG. 6, in the Design Range, the drag encountered by the concave bowl (as shown by curve A) is less than that encountered by the flat disk (as shown by curve B). Accordingly, for air mass flow rates in the Design Range, a concave bowl heat exchange structure encounters less drag than a flat disk heat exchange structure.

The curves A' and B' illustrate variations in pressure loss (or pressure drop) according to different air mass flow rates. The curve A' represents the pressure loss that occurs at the front surface of a concave bowl structure. The curve B' represents pressure loss at the front surface of a flat disk. As shown in FIG. 6, for a range of air mass flow rates, the pressure loss at the front surface of a concave bowl (as shown by curve N) is reduced in comparison with the pressure loss for a flat disk (as shown by curve B'). Accordingly, in one embodiment, a heat exchange structure having a concave bowl shape can be designed to have a corresponding porosity to achieve a desired air mass flow rate. The concave bowl structure experiences less drag and less pressure drop at its front surface than does a flat disk structure.

Figure 7:
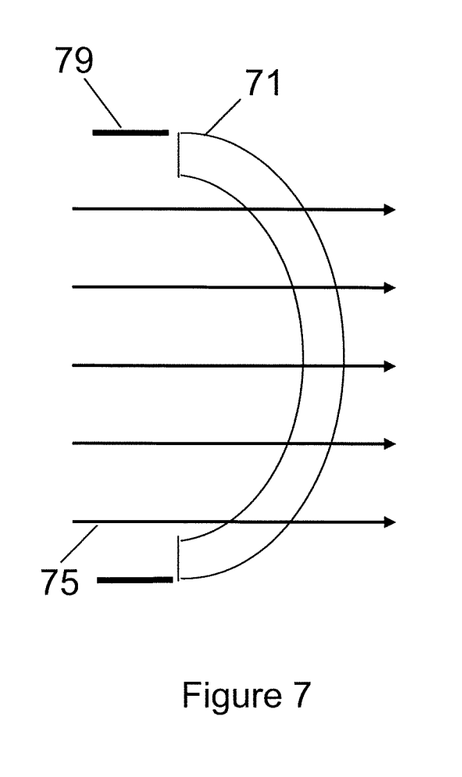
FIG. 7 is a top plan view of a heat exchange structure according to another embodiment of the present invention.

According to another exemplary embodiment, as shown in the top plan view of FIG. 7, a heat exchange structure 71 in a free air stream 75 further includes one or more slats 79 at the edges of the heat exchange structure 71. Slats 79 can be located on vertical edges of the heat exchange structure 71 as shown in FIG. 7. However, the present invention is not limited thereto, and slats 79 may be located at any suitable location on the heat exchange structure 71, such as on the upper edge, lower edge, or any horizontal edge of the heat exchange structure 71.

The slats 79 provide heat exchange structure 71 with a degree of ducting to reduce the spillage of air around the edges of the heat exchange structure 71. A reduction in air spillage around the edges of the heat exchange structure 71 may further increase the drag coefficient for pressure drag acting on the front surface of the heat exchange apparatus, resulting in more air from the free air stream 75 being forced through the front surface of the heat exchange structure 71. When the pressure at the front surface of the heat exchange apparatus is increased, the pressure at the back end may be correspondingly decreased. The resulting overall increase in the differential pressure front to back improves the heat exchange apparatus's heat transfer capacity in a free air stream by maximizing the amount of air intake for a given area of the heat exchange structure surface. Accordingly, the air flow through the heat exchange structure 71 in a free air stream 75 may be improved through the use of slats 79 around its edges.

Figure 8A:
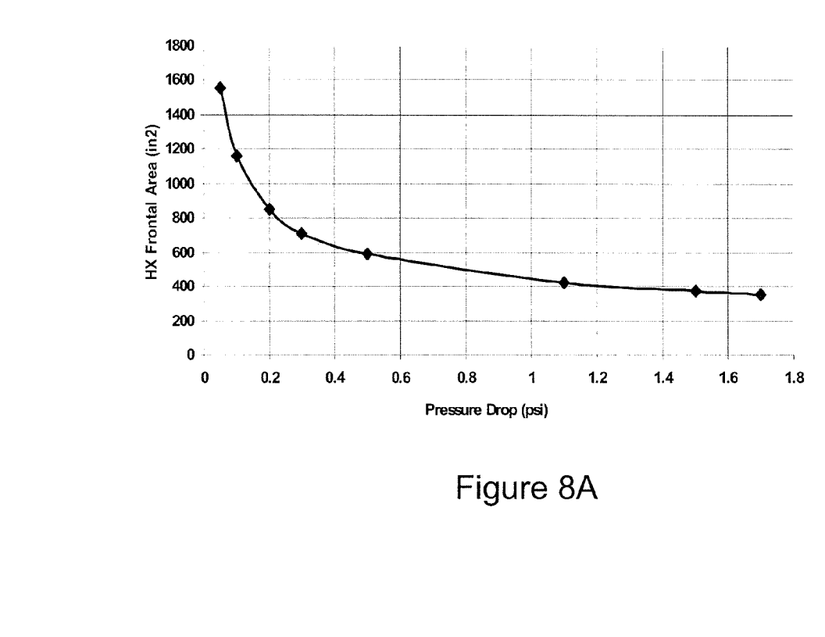
FIG. 8A is a graph showing a relationship between frontal area of a heat exchange apparatus and pressure drop per square inch of the heat exchange apparatus.
Figure 8B:
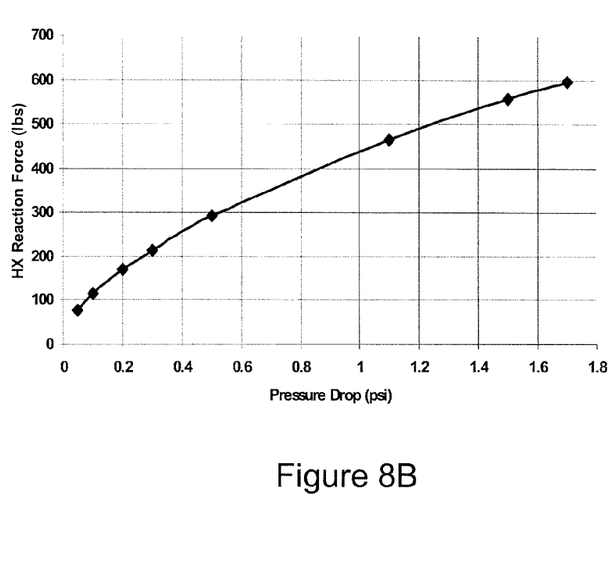
FIG. 8B is a graph showing a relationship between drag encountered by a heat exchange apparatus and pressure drop per square inch of the heat exchange apparatus.

For a heat exchange apparatus in a free air stream, a lower pressure drop at the front surface of the heat exchange apparatus and reduced drag are desired. According to another embodiment of the present invention, a heat exchange structure can be designed to have a larger frontal surface area while still experiencing reduced drag and reduced pressure drop at its front surface when in a deployed condition. FIG. 8A shows a relationship between the frontal surface area of a heat exchange apparatus and various pressure drop values. FIG. 8B shows a relationship between the heat exchange reaction force, or drag, encountered by the heat exchange apparatus and various values for pressure drop. In FIGS. 8A and 8B, the simulated heat load to be removed is 60 kW, and the heat exchange apparatus is traveling at a calibrated airspeed (CAS) of 307 KCAS per 30 kft.

As shown in FIG. 8A, the heat exchange apparatus experiences a decrease in pressure drop at higher frontal surface areas. Between about 500 and 700 square inches (in$^2$) of frontal area, the pressure drop can be as low as about 0.8 to 0.3 pounds per square inch (psi). At frontal surface areas greater than 700 in$^2$, the slope of the curve increases, which indicates that the pressure drop decreases more slowly than the frontal area increases. In other words, the improvement (or decrease) in pressure drop is less pronounced at frontal surface areas greater than 700 in$^2$. At frontal surface areas greater than 700 in$^2$, the heat exchange surface has greater porosity; however, the corresponding improvement (or decrease) in pressure drop due to the increased porosity is less than at frontal surface areas below 700 in$^2$. Thus, in one embodiment a heat exchange structure is designed to have an increased frontal surface area and a decreased pressure drop at its front surface. For example, a heat exchange apparatus can be designed to have a pressure drop of 0.5 psi by forming the heat exchange structure to have a frontal surface area of 600 in$^2$, with dimensions of 10 inches tall by 60 inches wide.

As shown in FIG. 8B, as the pressure drop is reduced, the reaction force, or drag, encountered by the heat exchange apparatus also decreases due to the corresponding increase in porosity of the heat exchange structure. Thus, increasing the frontal surface area and porosity of the heat exchange apparatus can decrease the pressure drop and drag experienced by the heat exchange apparatus.

In order to increase the frontal surface area of the heat exchange apparatus, in one embodiment the heat exchange structure is expanded into a deployed condition and collapsed and retracted into a stowed condition. The heat exchange apparatus may deploy (e.g., pivot or "flip" in an outward direction) from any one of several locations on the vehicle or vehicle component, and then expand (e.g., unfold) to increase its frontal surface area in the free air stream.

Figure 9A:
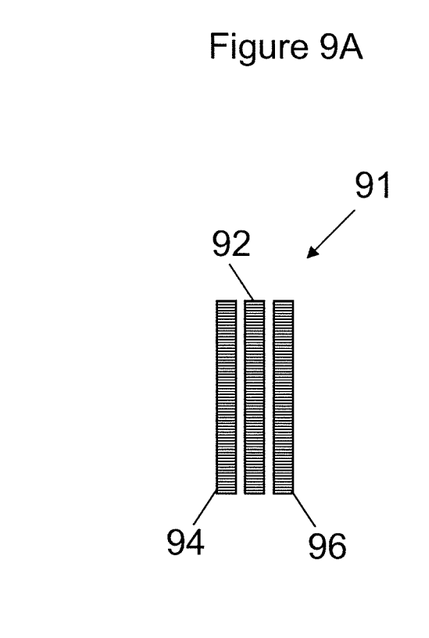
FIGS. 9A through 9C are bottom views of a heat exchange apparatus in stowed and expanded configurations according to an embodiment of the present invention.
Figure 9B:
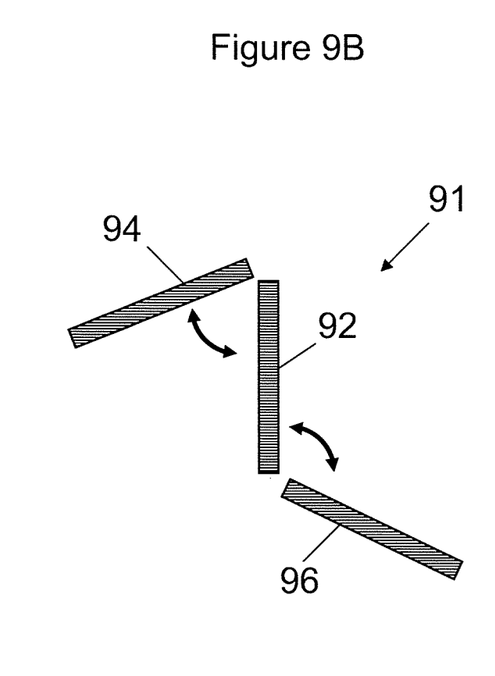
Figure 9C:
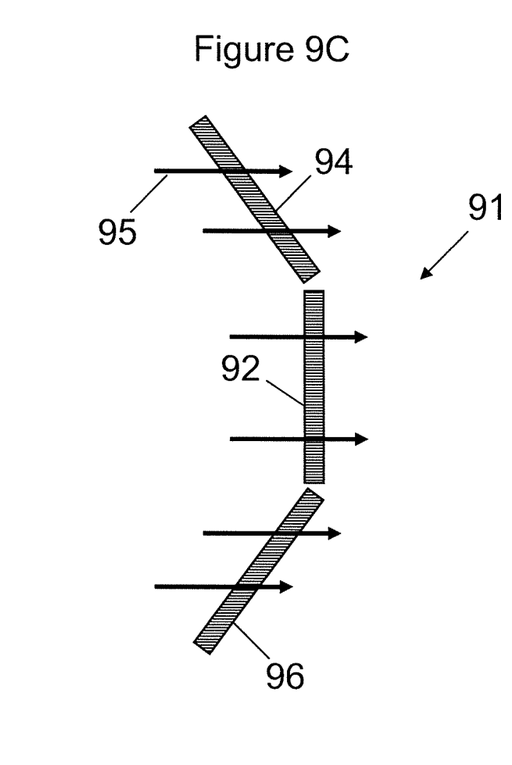
Figure 10A:
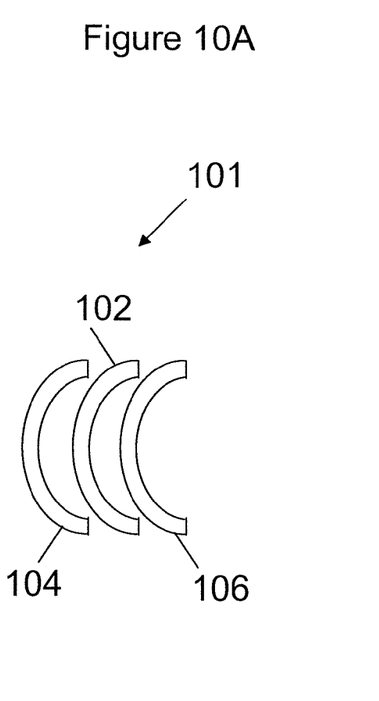
FIGS. 10A through 10C are bottom views of a heat exchange apparatus in stowed and expanded configurations according to an embodiment of the present invention.
Figure 10B:
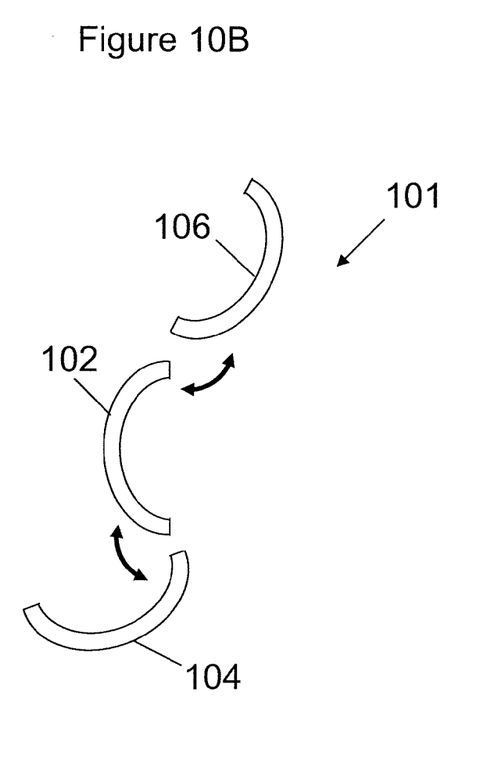
Figure 10C:
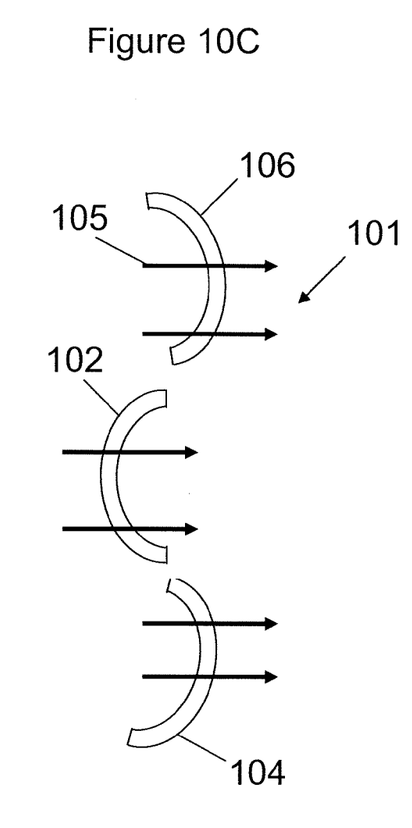

FIGS. 9A through 9C are bottom views of a heat exchange structure 91 having a flat disk shape, in closed, partially expanded, and fully expanded configurations, according to an embodiment of the present invention. FIGS. 10A through 10C are bottom views of a heat exchange structure 101 having curved surfaces, in closed, partially expanded, and fully expanded configurations, according to another embodiment of the present invention.

In one embodiment, an expandable heat exchange structure in a deployed condition expands laterally relative to the free air stream to increase its width, in order to increase its frontal surface area. For example, as shown in FIGS. 9A through 9C, in one embodiment a heat exchange structure 91 includes a first panel 92, a second panel 94, and a third panel 96. The panels 92, 94, and 96 are shaped as flat disks. FIG. 9A shows the heat exchange structure 91 in a closed configuration with the panels 92, 94, and 96 compactly nested together. FIG. 9B shows the heat exchange apparatus in a partially expanded configuration, with the panels 92, 94, and 96 unfolding. As shown, the first panel 92 is positioned at the center of the heat exchange structure 91, the second panel 94 folds out from one side of the first panel 92 and in one direction, and the third panel 96 folds out from the other side of the first panel 92 and in the opposite direction from the second panel 94. FIG. 9C shows the heat exchange structure 91 in a fully expanded configuration with the panels 92, 94, and 96 fully open into the free air stream 95.

According to another embodiment, as shown in FIGS. 10A through 10C, a heat exchange structure 101 includes a first panel 102, a second panel 104, and a third panel 106. The panels 102, 104, and 106 have curved surfaces. FIG. 10A shows the heat exchange structure 101 in a closed configuration with the panels 102, 104, and 106 compactly nested together. FIG. 10B shows the heat exchange structure 101 in a partially expanded configuration, with the panels 102, 104, and 106 unfolding. As shown, the first panel 102 is located at the center of the heat exchange structure 101 and is convex into the free air stream 105, the second panel 104 folds out from one side of the first panel 102 and in one direction, and the third panel 106 folds out from the other side of the first panel 102 and in a direction opposite from the second panel 104. FIG. 10C shows the heat exchange structure 101 in a fully expanded configuration with the panels 102, 104, and 106 fully open. Second and third panels 104 and 106 are concave into the free air stream 105 in the fully expanded configuration.

Expandable heat exchange structures may be useful, for example, in a vehicle such as an aircraft, in which it is necessary to reduce potential interference with a runway when landing. The heat exchange apparatus may be configured to reduce its overall height in the deployed condition, while still increasing the total frontal surface area of the heat exchanging apparatus. For example, for a desired total frontal surface area of 400 square inches, a heat exchange frontal surface area structure that is 40 inches wide by 10 inches tall can be used, instead of a structure that is 20 inches wide by 20 inches tall. As such, if the deployment mechanism fails to retract the heat exchange structure, the aircraft may still have sufficient clearance for landing.

According to another embodiment of the present invention, a method of operating a heat exchange apparatus in a free air stream includes providing a heat exchange structure and a deployment mechanism, stowing the heat exchange structure to conform to a body of a vehicle when in a stowed condition, and deploying the heat exchange structure to a deployed condition external to the vehicle.

In one embodiment, the heat exchange structure has a curved surface, and the step of deploying the heat exchange surface includes moving the heat exchange surface to a deployed condition such that the curved surface is concave into the air stream. In one embodiment, the deployment mechanism moves the heat exchange structure in a direction toward the nose of the vehicle. In other embodiments, the deployment mechanism may move the heat exchange structure in a direction toward the tail of the vehicle, or in any other suitable direction.

In one embodiment, the method further includes expanding the heat exchange structure in the deployed condition to increase the width of the heat exchange structure. For example, the heat exchange structure may be formed of a plurality of panels that move laterally with respect to the air stream to increase the width of the heat exchange structure. The plurality of panels may also unfold to increase the width of the heat exchange structure in the deployed condition. In one embodiment, the method also includes retracting the heat exchange structure back into the vehicle, to return it to a stowed condition.

As this invention has been described herein by way of exemplary embodiments, many modifications and variations will be apparent to those skilled in the art. Accordingly, it is to be understood that the invention described herein may be embodied other than as specifically described herein. For example, a heat exchange apparatus according to the present embodiment may expand in any direction relative to the free air stream to increase its frontal surface area or to reduce the extent of its protrusion beyond the vehicle. In addition, the panels may have any suitable shape and are not limited to only flat and curved shaped panels. Further, it is to be understood that the steps of the methods described herein are not necessarily in any particular order.

What is claimed is:

1. A heat exchange apparatus in combination with an aircraft and configured to operate in a free air stream, comprising:
    an aircraft vehicle body having a substantially cylindrical portion defining an external surface of the aircraft;
    a heat exchange structure, without a cowling, having a front surface and a rear surface opposite to the front surface, the rear surface having a shape configured to conform to a curve of the substantially cylindrical portion of the aircraft vehicle body when in a stowed condition and the front surface having a curved surface configured to face the free air stream when in a deployed condition external of the aircraft vehicle body; and
    a deployment mechanism for pivoting the heat exchange structure from the substantially cylindrical portion of the aircraft vehicle body to the deployed condition external of the aircraft vehicle body such that the curved front surface of the heat exchange structure facing the air stream permits air flow through the curved front surface when in the deployed condition.

2. The heat exchange apparatus of claim 1, wherein the curved front surface is concave facing the air stream when the heat exchange structure is in the deployed condition.

3. The heat exchange apparatus of claim 1, wherein the heat exchange structure is substantially semicylindrical in shape.

4. The heat exchange apparatus of claim 1, wherein the heat exchange structure is tapered.

5. The heat exchange apparatus of claim 1, wherein the heat exchange structure is moved by the deployment mechanism in a direction toward a tail of the aircraft vehicle body.

6. The heat exchange apparatus of claim 1, wherein the heat exchange structure is moved by the deployment mechanism in a direction toward a nose of the aircraft vehicle body.

\* \* \* \* \*